United States Patent [19]

Corbett, Jr. et al.

[11] Patent Number: 4,549,663
[45] Date of Patent: Oct. 29, 1985

[54] STORAGE SYSTEM FOR TRAILER FRAMES

[75] Inventors: Scott S. Corbett, Jr., 6412 SE. 29th Ave., Portland, Oreg. 97202; Lynn F. Perrott, 15928 NE. Rose Pkwy., Portland, Oreg. 97230; William L. Reiersgaard, Portland, Oreg.

[73] Assignees: Scott S. Corbett, Jr.; Lynn F. Perrott, both of Portland, Oreg.

[21] Appl. No.: 466,730

[22] Filed: Feb. 16, 1983

[51] Int. Cl.⁴ .............................................. A47F 7/00
[52] U.S. Cl. ........................................ 211/13; 296/3; 410/31
[58] Field of Search ................... 211/70.4, 13, 60 R, 211/182, 192, 193, 195, 207, 4, 59.4; 410/31–48; 296/3; 248/544; 414/22

[56] References Cited

U.S. PATENT DOCUMENTS

| | | | |
|---|---|---|---|
| 1,280,512 | 10/1918 | Macomber | 410/16 |
| 1,947,553 | 2/1934 | Johnston | 211/70.4 |
| 2,129,950 | 9/1938 | Loney | 410/43 |
| 2,449,491 | 9/1948 | Liebegott | 410/38 |
| 2,567,328 | 9/1951 | Fahland | 410/43 |
| 2,619,234 | 11/1952 | Stone | 211/4 |
| 2,738,076 | 3/1956 | Porter | 211/70.4 |
| 3,145,802 | 8/1964 | Woolslayer et al. | 211/70.4 |
| 3,675,795 | 7/1972 | Dluhy | 214/16.1 CC |
| 3,677,193 | 7/1972 | Pringle | 410/5 |
| 3,752,085 | 8/1973 | Venditty | 410/6 |
| 3,872,983 | 3/1975 | Chapman | 410/6 |
| 4,171,077 | 10/1979 | Richard, Jr. | 211/18 X |
| 4,427,117 | 1/1984 | Matthewson et al. | 211/13 |

Primary Examiner—J. Franklin Foss
Assistant Examiner—David L. Talbott
Attorney, Agent, or Firm—Oliver D. Olson

[57] ABSTRACT

A trailer frame storage system comprises a plurality of storage units connected closely together in laterally spaced apart condition, each storage unit having a plurality of longitudinally spaced, folding trailer frame support arms each arranged to receive and support a trailer frame for storage in a substantially vertical position in which the trailer frame is rested on its rear end on the ground and its forward end extends upwardly. Each arm is extended, one at a time from rear to front, by movement of the next rearward arm to fully extended position as a trailer frame is rested against it, the frames being transported longitudinally into the storage unit, successively filling the unit from the rear end to the front end. Removal of the stored trailer frames follows the reverse order, and removal of each frame results in it engaging the next adjacent forward arm from which a trailer frame has been removed, to cause said forward arm to be moved toward retracted position.

13 Claims, 11 Drawing Figures

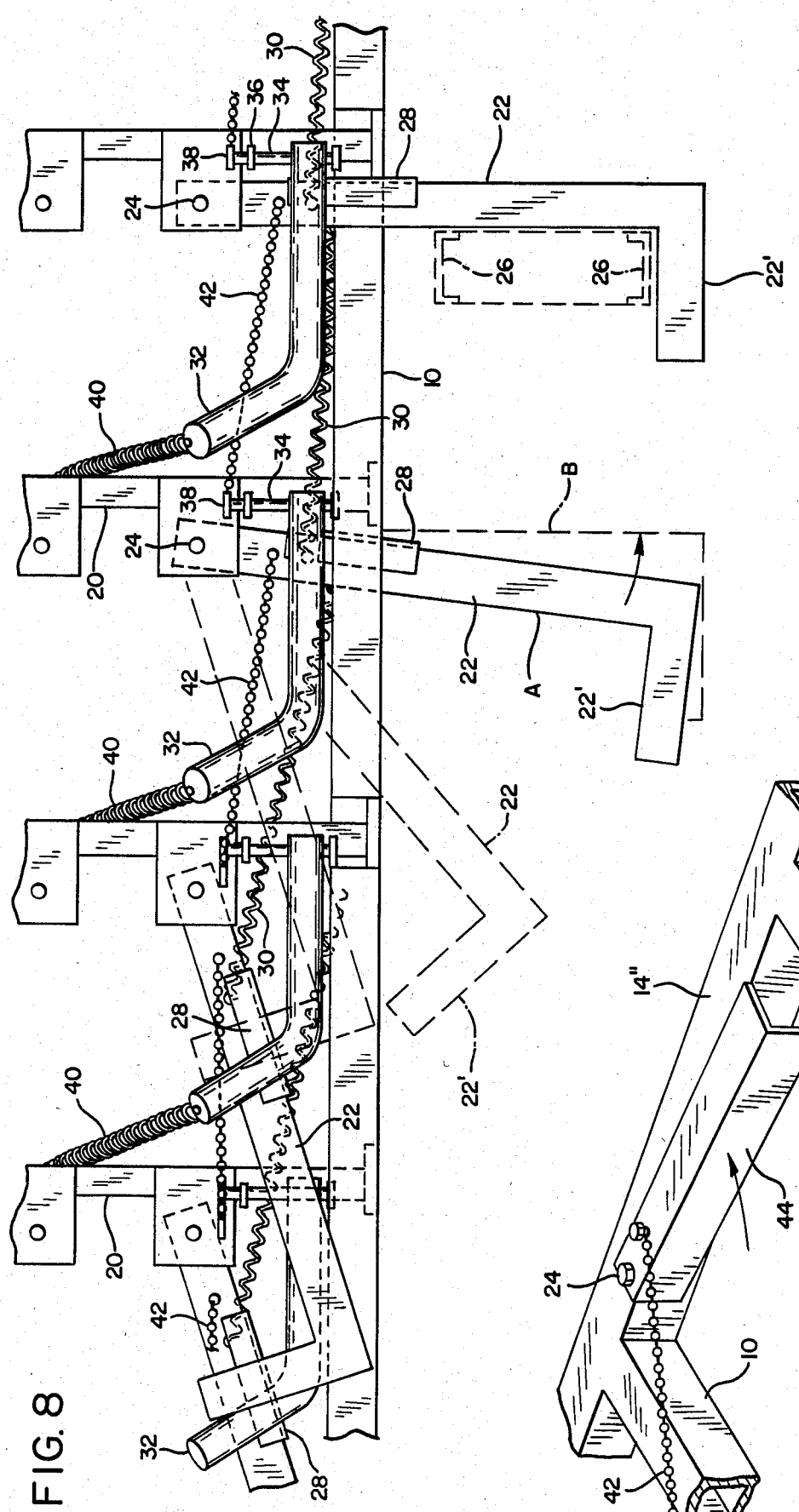

STORAGE SYSTEM FOR TRAILER FRAMES

BACKGROUND OF THE INVENTION

This invention relates to the storage of trailer frames, and more particularly to a system for storing a multiplicity of empty trailer frames on end in a substantially vertical position.

Trailer frames of the type that removably support cargo containers are often out of service for extended periods of time when the containers have been removed for transport by rail or ship. The empty frames are left at the container unloading site, most often scattered in haphazard manner about the site and in normal horizontal position. This arrangement utilizes an excessive amount of valuable space and also exposes the empty but expensive frames to easy removal by unauthorized people.

SUMMARY OF THE INVENTION

In its basic concept, the storage system of this invention includes a horizontally elongated framework which mounts a plurality of arms spaced apart at intervals along the length of the framework and movable between a retracted position adjacent the framework and an extended position projecting laterally from the framework for supporting a trailer frame disposed on end in substantially vertical position.

It is by virtue of the foregoing basic concept that the principal objective of this invention is achieved; namely, to provide a system by which a multiplicity of empty trailer frames may be stored retrievably in a minimum of floor space.

Another objective of this invention is the provision of a storage system of the class described in which the extension of each arm is initiated by the deposit of a trailer frame against the next preceding extended arm, whereby to allow filling of the storage system from the back end to the front end.

A further objective of this invention is the provision of a storage system of the class described in which the framework supports arms for retractable extension to both sides of the framework, whereby to double the storage capacity associated with the framework.

Still another objective of this invention is the provision of a storage system of the class described in which a plurality of frameworks may be joined together at laterally spaced apart positions with a minimum of space required between confronting extended arms, whereby to expand still further the storage capacity in a minimum of floor space.

A still further objective of this invention is the provision of a storage system of the class described in which retraction of each arm is initiated by removal of the trailer frame from the next preceding extended arm.

Another objective of this invention is the provision of a storage system of the class described in which extension and retraction of the support arms may be accomplished manually or automatically after initiation by installation or removal of an adjacent trailer frame without need for hydraulics or electrical power.

A further objective of this invention is the provision of a storage system of the class described in which the assembly of framework and supported arms is formed as a compact structure capable of transport with facility on a conventional truck.

Yet another objective of this invention is the provision of a storage system of the class described which is of simplified construction for economical manufacture, operation and maintenence.

The foregoing and other objects and advantages of this invention will appear from the following detailed description taken in connection with the accompanying drawings of preferred embodiments.

BRIEF DESCRIPTION OF THE DRAWINGS

FIG. 8 is a fragmentary plan view of a portion of FIG. 3 showing details of the trailer support arm locking mechanism, as viewed from the top in FIG. 6.

FIG. 9 is a fragmentary perspective view of a support arm release mechanism arranged on the back beam of the storage system of this invention.

DESCRIPTION OF THE PREFERRED EMBODIMENT

Figure 1:
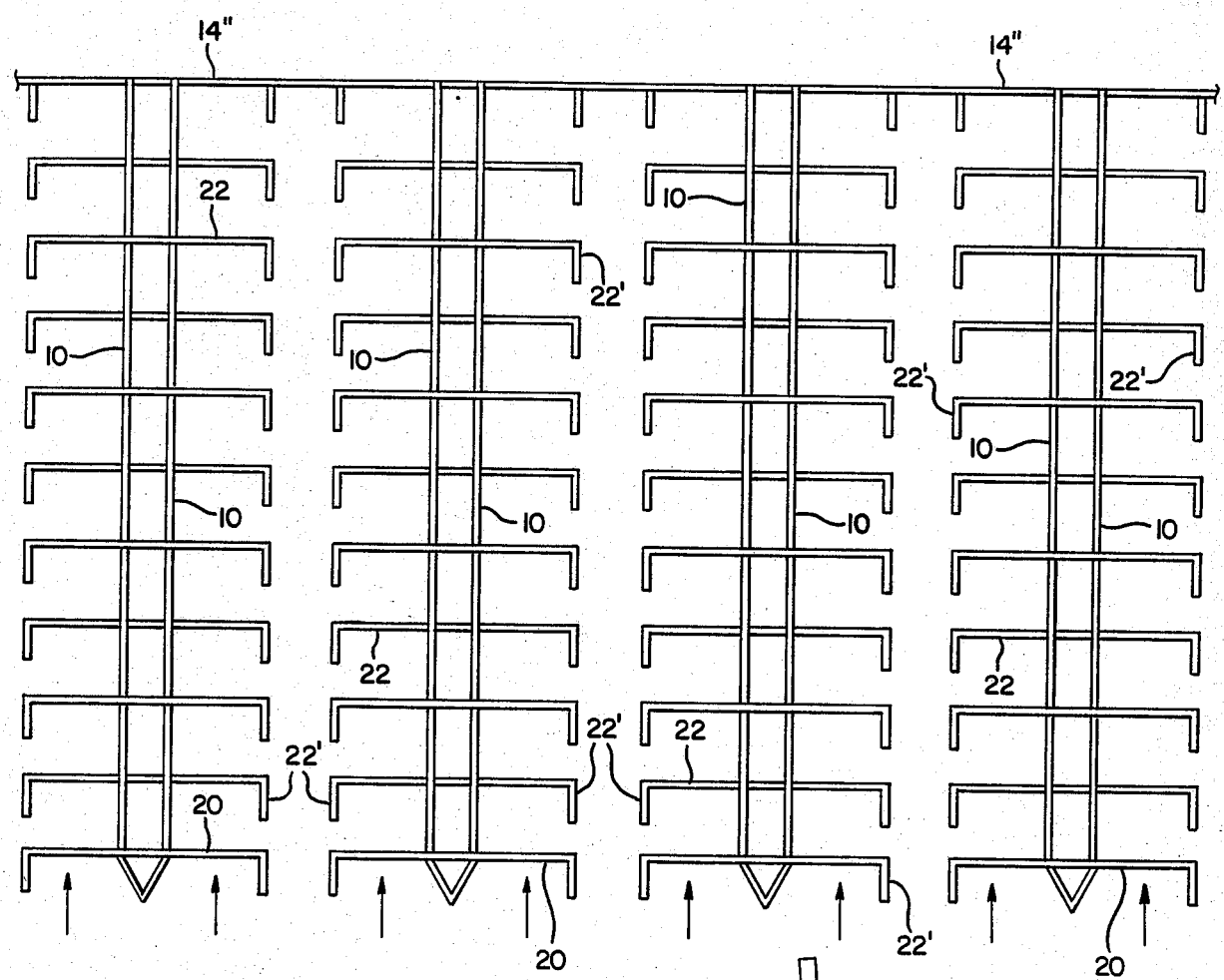
FIG. 1 is a fragmentary schematic plan view of a storage system embodying the features of this invention, the system comprising a plurality of laterally spaced apart storage units each having a plurality of longitudinally spaced trailer frame support arms.

FIG. 1 illustrates a trailer frame storage system embodying the features of this invention. The system includes a plurality of longitudinally extending chassis storage assemblies connected together in laterally spaced apart positions. The drawing illustrates the the storage system in fully loaded condition, although for simplicity the individual trailer frames are not shown in FIG. 1.

Figure 2:
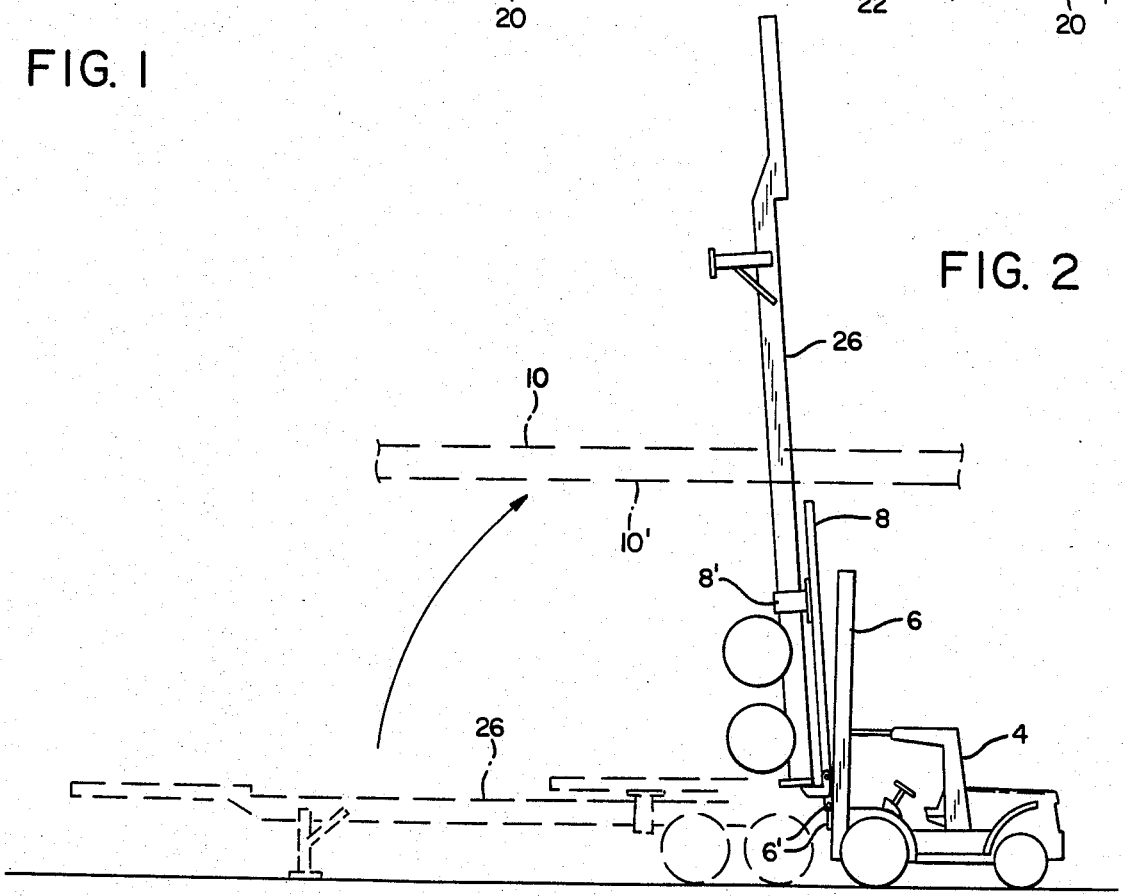
FIG. 2 is a side elevation of a trailer frame transporting vehicle engaging a trailer frame, the vertical elevation of the framework of the storage system being shown in broken lines and the horizontal and vertical dispositions of the trailer frame being shown in broken and full lines, respectively.

The storage system of this invention has particular utility in storing empty trailer frames on end in vertical position as delivered by a transport vehicle such as is shown in FIG. 2 and more fully described in U.S. patent applications Ser. No. 378,811 filed May 17, 1982 by Joseph L. Riley and entitled Method and System For Storing Wheeled Frames of Detachable Cargo Container Type Trailers, and Ser. No. 412,504 filed Aug. 20, 1982 by Lynn F. Perrott and entitled Wheeled Trailer Frame Carrying Unit Attachment for Lift Truck. Both of said applications have common assignee with the present application.

The transport vehicle illustrated in FIG. 2 is a lift truck 4 having a conventional mast 6 which mounts a lift carriage 6'. As is common with modern lift trucks, the carriage 6' is vertically extendable along the mast, and is provided for side shift movement as well, a feature which is particularly useful in this application. The carriage 6' mounts a trailer frame transporting boom assembly 8 which is arranged for movement between horizontal and vertical positions. The boom assembly includes clamps 8' configured to grasp a trailer frame while in horizontal position and to move it to vertical position for transport to a storage site. The vehicle deposits the frame, still in vertical condition, into the storage structure, where it is stored in said vertical position.

Figure 4:
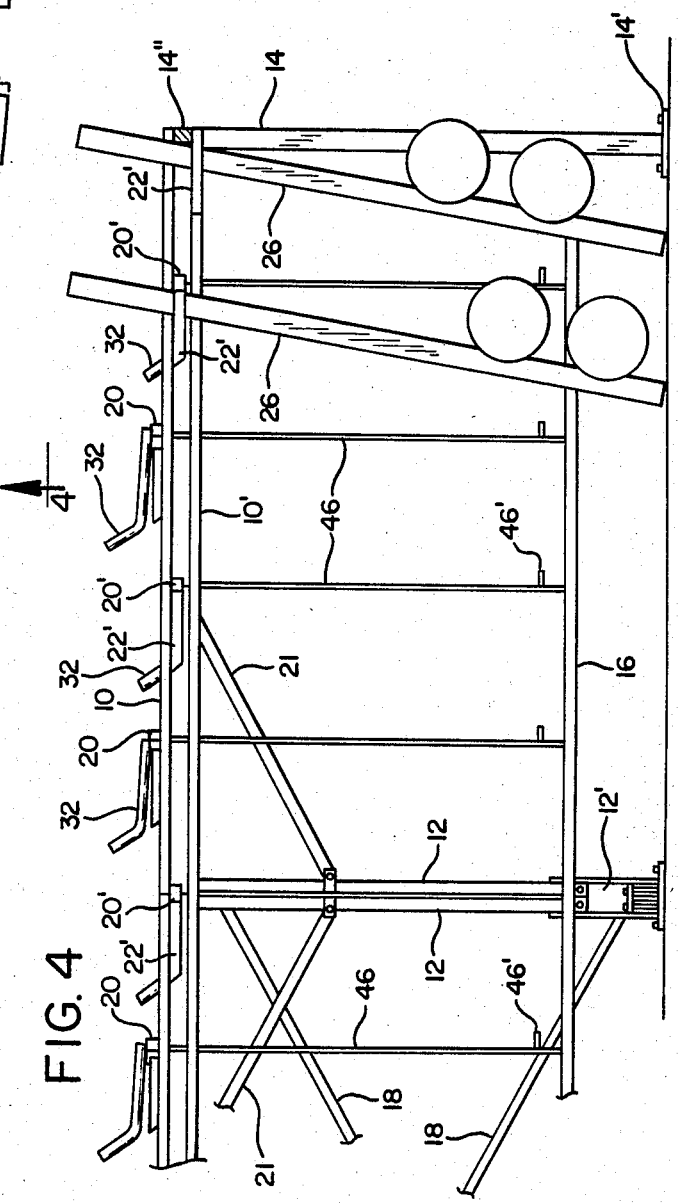
FIG. 4 is a fragmentary side elevation of the storage unit of FIG. 3, as viewed in the direction of arrow 4—4 in FIG. 3.

Each storage assembly includes a framework comprising vertically spaced horizontally extending side rails 10 and 10' supported on column 12 above a ground or other floor surface by a distance which is greater than the operative height of the boom 8, as shown in FIG. 2. The columns 12 supporting the rails 10 and 10' and the columns 14 supporting the rear horizontal connecting beam 14" are attached to the ground by suitable anchoring means such as base members 12' and 14' respectively. The columns 12 and 14 are illustrated in FIG. 4 as mounting lower longitudinal rub rails 16. The columns are interconnected by stabilizing tie rods 18. Cross bars 20 and 20' interconnect the laterally spaced rails 10 and 10', respectively, alternately along the length of the rails, and are stabilized by braces 21.

Figure 3:
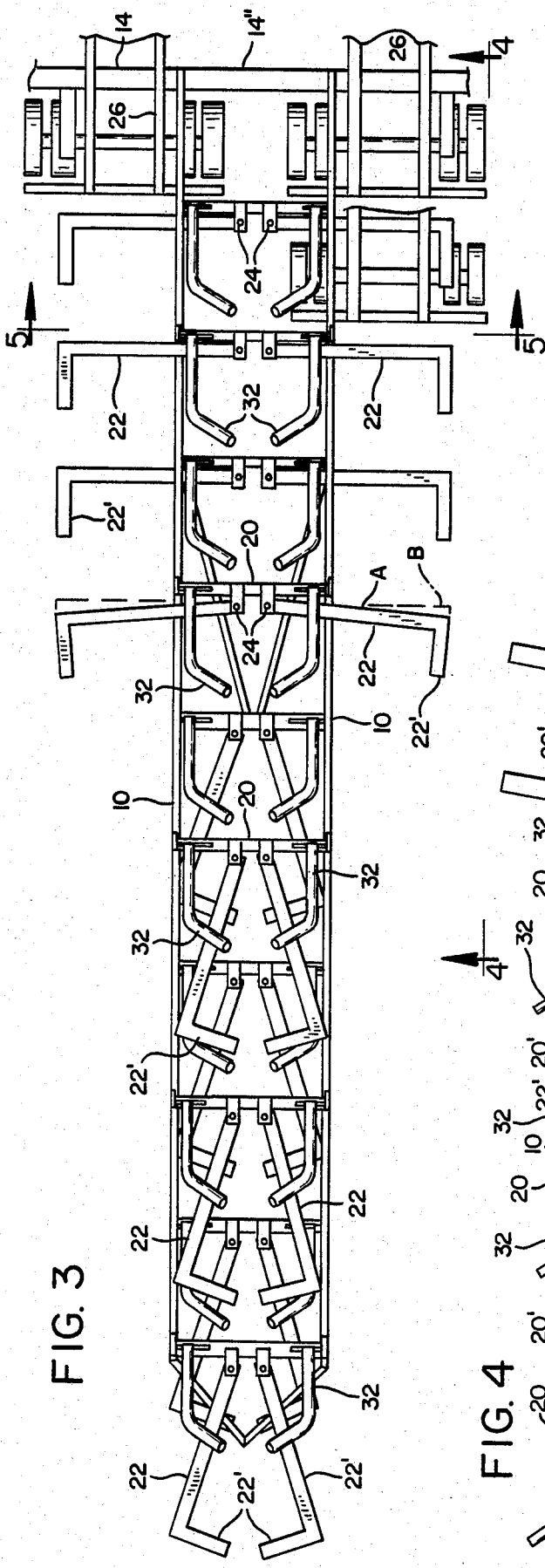
FIG. 3 is a fragmentary plan view of one storage unit of a storage system embodying the features of this invention, the storage unit shown in partly filled condition.

A plurality of trailer frame support arms 22 are mounted by pivot members 24 alternately to cross bars 20 and 20' to allow them to overlap in their retracted position shown in FIG. 3. This overlapping arrangement may be avoided, if desired, by shortening the length of the end closure bar 22' which projects perpendicularly forward from the arm 22, to terminate short of the adjacent arm 22 in said retracted position. In this case the lower rails 10' also may be omitted.

For illustration purposes FIG. 3 shows the left half of the storage assembly in closed, unloaded condition and the right half in open, loaded condition. Although only three wheeled trailer frames 26 are illustrated, it is to be understood that all eight compartments at the right contain trailer frames and that some have been omitted for purposes of clarity. Each support arm 22 is configured as an elongated member arranged to pivot freely at its inner end about its axis 24 between a folded, retracted position in which the arm is contained inboard of the associated rail 10 or 10' and an extended position in which the arm extends laterally outward, perpendicular to said rail.

The enclosure bar 22' is mounted on the outer end of the arm 22 and arranged to project perpendicularly therefrom and in the same plane thereof. The enclosure bar is configured to extend a sufficient distance forwardly from the arm 22 to capture a trailer frame 26 resting on the arm 22 so as to prevent inadvertent displacement of the frame laterally outward off of the arm.

Figure 6:
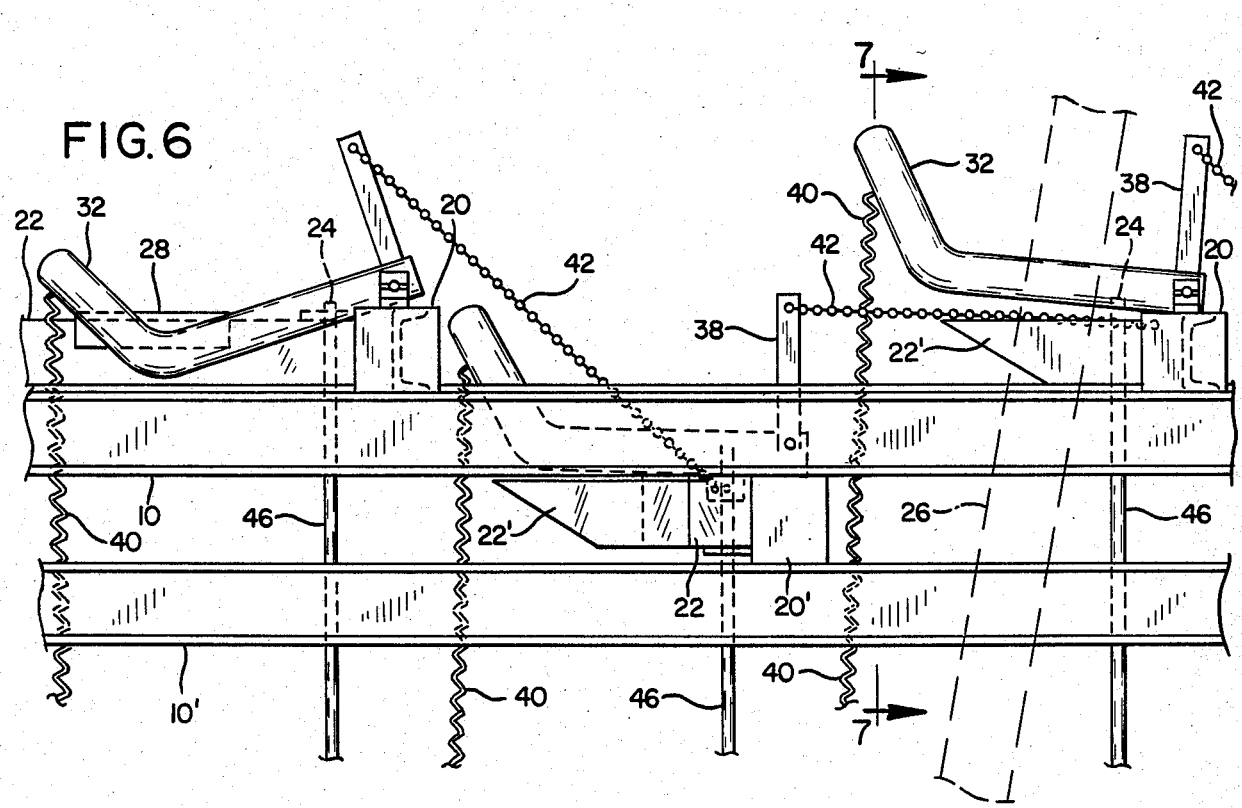
FIG. 6 is a fragmentary side elevation, similar to FIG. 4, showing details of the locking mechanism associated with a trailer support arm.

The storage system of this invention includes means for manual or automatic control of movement of the arms 22 between their retracted and extended positions. Referring primarily to FIGS. 6 and 8 of the drawings, the arms 22 are supported by the pivot members 24 in a position slightly above the planes of the upper surfaces of the associated frame rails 10 and 10', thereby permitting free swinging, or slight frictional sliding movement of the arm outwardly over the rail. An anti-friction pad 28 is disposed on each arm 22 for association with a locking cam described hereinafter.

A trailer support arm spring 30 is connected at one of its ends to the support arm 22 outwardly of the pivot 24, and at its opposite end to a stationary point on the corresponding rail 10 or 10' of the storage structure framework. The spring is arranged to be tensioned when the arm is in folded condition inwardly of the rails and is substantially relaxed when the arm is in extended position projecting perpendicularly outward of the rails. Thus, the spring influences the support arm to assume its functional extended position for receiving a trailer frame. It is intended that the arm 22 not be permitted to assume its fully extended position solely as a result of the influence provided by the tension spring 30. Means therefore is provided for stopping the extension of the arm prior to its reaching fully open position. For this purpose the arm is arranged to frictionally engage the rail to smoothly stop it in approximately the position illustrated in solid lines "A" in FIG. 8. Continued movement of the arm to the fully open, perpendicularly extending position shown by the broken lines "B" is accomplished by the force exerted by the weight of a trailer frame resting against the arm.

Figure 7:
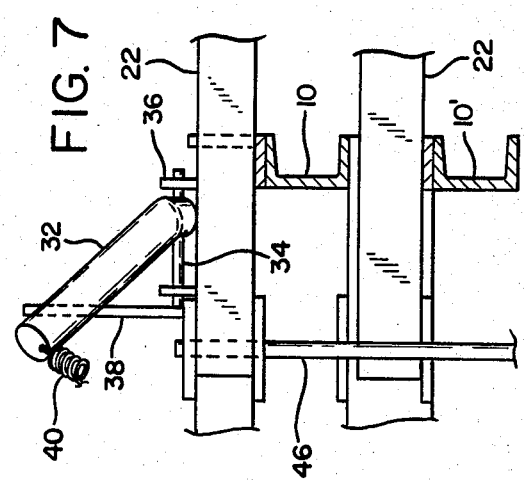
FIG. 7 is a fragmentary transverse section of the support arm locking mechanism shown in FIG. 6, taken along the line 7—7 in FIG. 6.

Since the spring 30 is arranged to cause the arm to assume the normal, "at rest" position "A" extending outwardly from the rail, means is provided to releasably secure each arm in retracted, folded position against the influence of its tension spring. Such a locking assembly includes, in the embodiment illustrated in FIGS. 3–8, a cam arm 32 mounted to the cross bar 20 and 20' of the framework for pivotal movement vertically relative to the arm 22. FIG. 7 best illustrates a cam arm having a compound bend intermediate its ends. The cam arm is secured for rotation with pivot shaft 34 which is supported by bearing 36 anchored to the framework. An elongated pull arm 38 is secured to the pivot shaft 34 and extends perpendicularly therefrom. Pulling the arm 38 rearward thus rotates the pivot shaft 34 about the bearing 36, thereby pivoting the cam arm 32 vertically upward.

As previously mentioned, the cam arm incorporates a compound bend in which, as illustrated, the end opposite its attachment to the pivot shaft is configured to extend upwardly and inwardly of the rail 10 or 10'. A spring 40 is attached at one of its ends to the outer, upwardly projecting end of the cam arm 32 and at its opposite end to one of the rub rails 16 or other component of the framework at a point below the cam arm as best shown in FIG. 6. The spring 40 therefore urges the cam arm resiliently downward to a normal "at rest" position.

Cam release activating means, illustrated herein as chain 42, connects the pull arm 38 of one cam arm assembly to its next rearwardly adjacent trailer support arm 22. The chain is configured of sufficient length as to become taut at the point that the trailer support arm comes to its "at rest" position "A" under the influence of its spring 30. Continued movement of the trailer support arm 22 to its fully extended position "B", by the force applied on it by the weight of a trailer frame being rested against it, pulls the arm 38 which rotates the shaft 34 and raises the cam arm 32 connected thereto.

The functional relationship of the cam arm and its associated support arm is best illustrated in FIG. 6 and the central portion of FIG. 8. With the trailer support arm 22 in folded position, the cam arm 32 is disposed between the arm 22 and the rail 10 or 10', with the upwardly and inwardly projecting portion of the cam arm 32 abutting the anti-friction pad 28 on the support arm and preventing the latter from pivoting outwardly. When the next adjacent support arm receives a trailer frame, it is pushed rearward to position "B" and the chain 42 pulls the cam arm which is raised vertically upward. The cam arm moves upward enough so that it no longer abuts the trailer arm. The latter then swings outwardly under the influence of its spring 30 to its normal "at rest" position "A". Subsequent to depositing another trailer frame against this trailer support arm the process repeats for the next forwardly adjacent arm.

Since it is desirable that a number of laterally spaced apart storage units be connected together by a rear beam 14", provision must be made on the back beam for a cam arm release mechanism associated with the next forward adjacent support arm. FIG. 9 illustrates a suitable release assembly for this purpose. A plate 44 is pivotally mounted to the back beam 14" and is spring loaded to extend a distance outwardly therefrom, similar in respect to the allowed movement between a support arm's "at rest" position "A", and its fully extended position "B".

A cam arm activating flexible line, such as chain 42 described hereinbefore is secured at one end to the plate 44 and at its opposite end to the pull arm 38 associated with the next adjacent trailer support arm 22. Depositing a trailer frame against the plate 44 moves it rearward to the beam 14" and pulls the chain 42, thereby activating the release mechanism described above for the next forward adjacent trailer support arm.

An alternative cam arm release primarily for use as a backup in situations of mechanical failure is provided. An arm rotator bar 46 (FIG. 4) engages each trailer support arm at its pivot 24, the bar mounting a handle 46'. Manually rotating the bar pivots the associated support arm 22 either to extended or retracted position, as desired.

Figure 5:
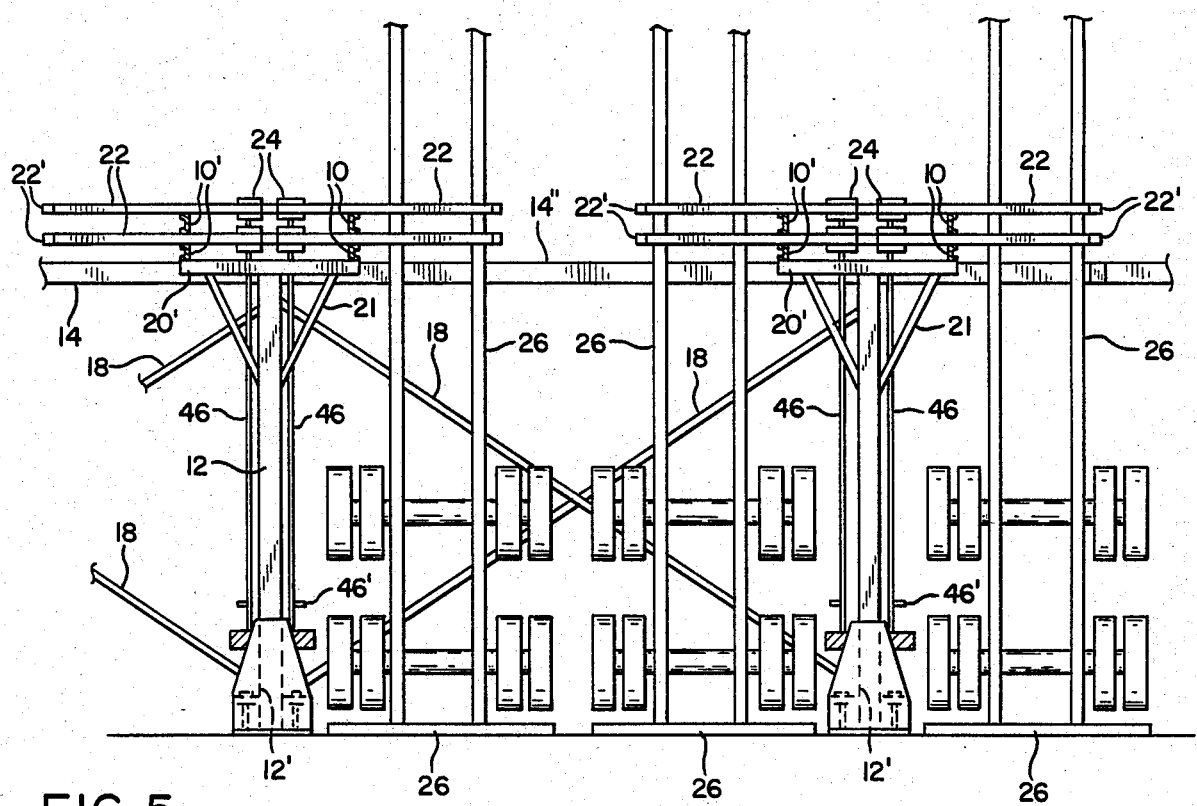
FIG. 5 is a fragmentary transverse sectional view taken along the line 5—5 in FIG. 3.

FIGS. 1 and 5 emphasize the efficiency with which this invention utilizes valuable storage space. Each framework assembly of pairs of rails 10 and 10' accommodates trailer support arms 22 for extension to both lateral sides of the framework. The storage assembly is designed to eliminate wasted space between units by receiving trailer frames 26 longitudinally rather than from the side. The system described permits longitudinal loading and unloading because the supporting arms 22 are retracted until needed, thus enabling the structure to be filled with trailer frames from the back to the front and removed from the front to the back. With side loading between adjacent arms 22, every other longitudinal assembly of FIG. 1 would have to be omitted to allow for manipulation of the lift truck or other vehicle 4.

The storage system may be arranged to accommodate as many storage units as may be necessary, and is designed to be expandable longitudinally to accommodate increased storage requirements. This is illustrated generally in FIG. 4 in which sections or modules having support columns 12 at each end are secured together with one column of each sharing a common ground base member 12'. Additionally, with the advent of the legality of trailers having six laterally spaced wheels on an axle, this storage system accommodates these vehicles simply by utilizing longer arms 22 or cross bars 20 and 20' to provide a slightly greater lateral spacing between storage units.

The loading and unloading operation of the trailer frame storage system described hereinbefore is as follows: Beginning with a completely empty storage unit in which all the trailer support arms are in retracted position, a trailer frame transporting apparatus, such as that illustrated generally in FIG. 2, is manuevered behind a horizontally disposed trailer frame, picks it up and swings it to vertical disposition. The frame is then moved to a position adjacent the front end of the framework of the system, and thence rearward alongside the rails 10 and 10' to the back of the storage unit. The rub rails 16 prevent the operator from inadvertently manuevering the vehicle too far inwardly toward the structure.

When the trailer frame is positioned appropriately in a desired storage slot, it is lowered until its rear end is resting on the ground or other floor. The forward portion of the trailer frame, which is projecting vertically upward beyond the storage unit, is rested against the already projecting arm 22 or back beam plate 44 defining the storage space. The weight of the trailer frame 26 against the arm 22 or plate 44 moves it rearwardly to its maximum extended position. This effects tensioning of the chain 42 and consequent movement of the cam arm 32 out of abutting contact with the next forward adjacent support arm 22. The arm swings outwardly under the influence of its spring 30 to its "at rest" position "A" (FIG. 8).

The outward swing of the arm 22 is slowed down by its sliding contact with the underside of the cam arm 32 and is stopped at the intermediate "at rest" position "A" when the chain 42 connecting the arm to the next succeeding cam arm 32 becomes taut.

The frame transporting vehicle 4, being lower in overall height than is the distance between the trailer support arms and the ground surface 2, backs out toward the front of the structure, under the partly opened arm and exits the storage system to pick up and transport another trailer frame. The above described process is repeated until all required units have been filled progressively from back to front. The storage system may be loaded either by filling each longitudinal row of each unit and then progressing to another unit row, or by loading successive lateral rows of the entire system progressively from the rear, at the operator's discretion.

The unloading operation begins at the forwardmost storage space of each unit and progresses to the rear. The transport vehicle engages a forwardmost stored trailer frame and lifts it, releasing the force applied against the support arm 22. With the tension thus released, the arm is allowed to pivot forward into its "at rest" position "A" and the cam arm 32 of the next adjacent forward arm 22 is allowed to act under the influence of its associated downwardly tensioned spring 40. The just-released arm 22 remains stationary in its "at rest" position, ready either to receive a new frame to be stored or until the next rearward adjacent trailer frame is removed.

Since the arm 22 is disposed high enough above ground that it does not interfere with the movement of the transport vehicle, the next trailer frame may be engaged with the forward support arm in "at rest" position. Therefore, in unloading the next frame, the vehicle engages the frame and begins to move it toward the front, which releases the cam arm 32 connected thereto. As the vehicle is reversed, the trailer frame abuts the back side of the earlier released support arm and pushes it toward retracted position.

Because of the compound bend configuration of the cam arm 32, and because it is spring loaded downward, when the arm 22 is pushed past the point at which the cam arm is bent, the cam arm slips downward and continues to push the trailer support arm inwardly to its fully locked, retracted position. The unloading process is repeated for each successive trailer frame, with each trailer frame being utilized to retract only its own adjacent forward arm. As mentioned previously, the arm rotator bar 46 may alternatively be used to pivot the trailer support arms into retracted position, if so desired.

Figure 10:
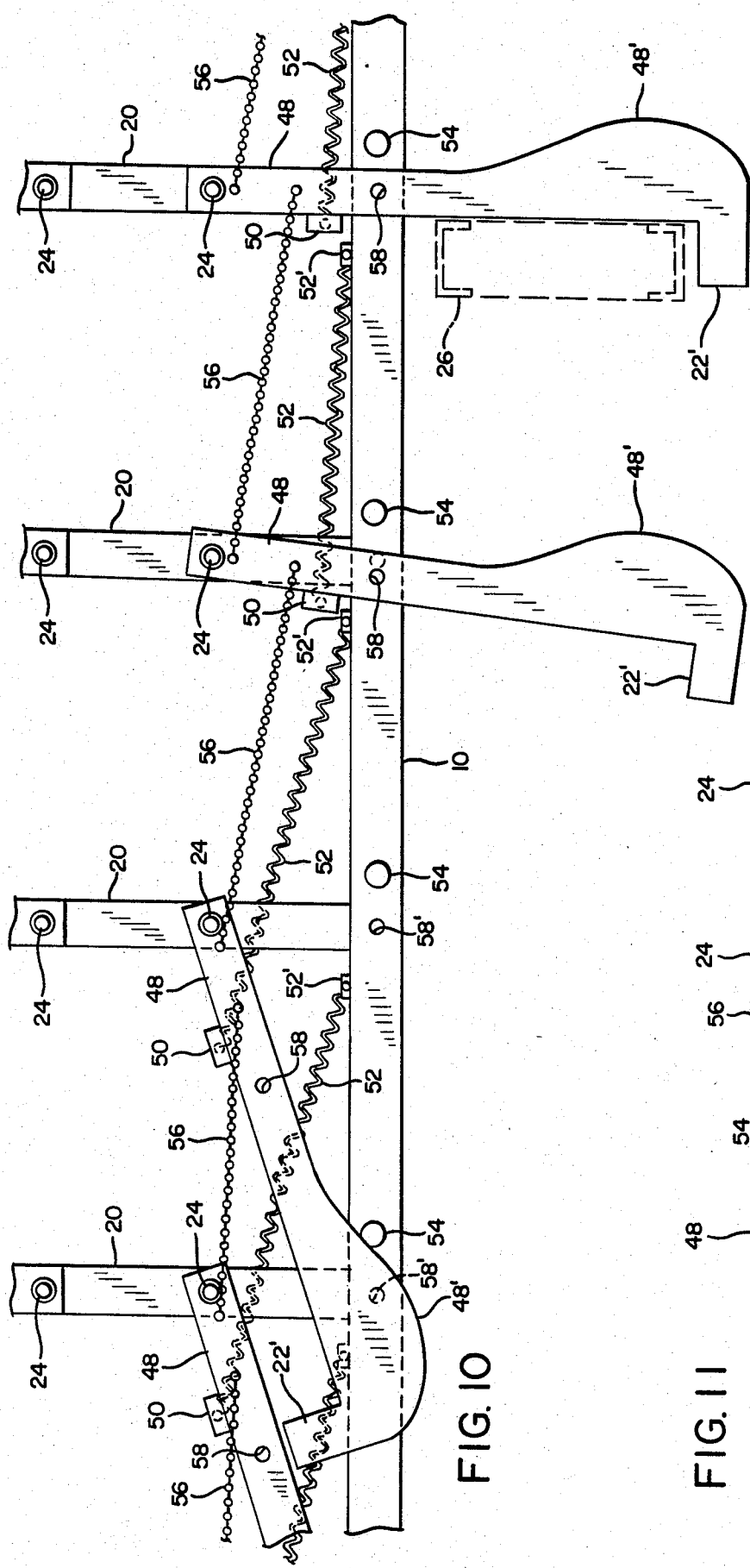
FIG. 10 is a fragmentary plan view similar to FIG. 8 but showing details of a second embodiment of the trailer support arm locking mechanism.
Figure 11:
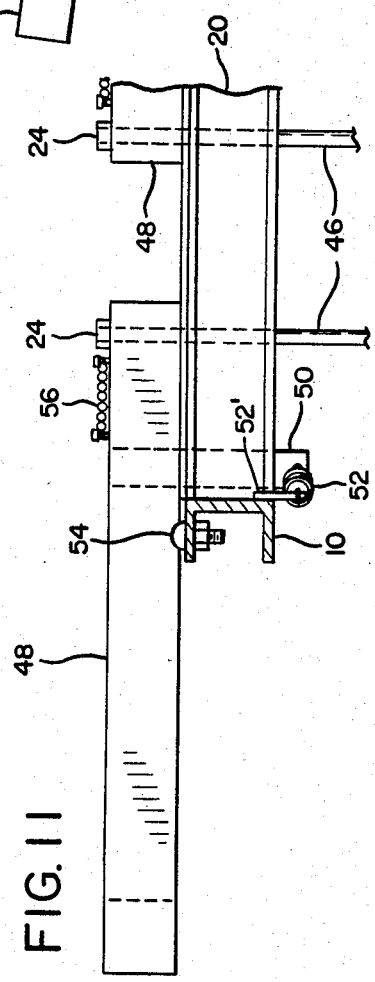
FIG. 11 is a fragmentary vertical end elevation as viewed from the right in FIG. 10.

Another embodiment of the storage system of this invention is illustrated in FIGS. 10 and 11. In this embodiment, the cam arm 32 and related mechanism previously described is eliminated without departing from the basic concept of the present invention. FIG. 10 illustrates trailer support arms 48 mounted to the framework cross bars 20 by pivot members 24, similarly as described for the arms 22.

A stop plate 50 is mounted to the forward edge of each arm 48 and is arranged to abut the confronting edge of the cross bar 20 when the arm is moved into fully extending position. Thus, the stop plate 50 holds the arm 48 at its fully extended position for supporting the weight of a trailer frame.

In this embodiment, the support arm tension spring 52 is secured at one of its ends to the bottom side of the stop plate 50 and at its opposite end to a bracket 52' extending below the bottom side of the framework rail 10, the spring extending beneath the cross bar 20. The spring 52 thus provides tension to move the arm 48 to the intermediate "at rest" position of extension (position "A" in FIG. 8) when the arm has been released from its retracted position. Friction or other suitable stopping mechanism is provided to stop the extending movement of the arm 48 at its intermediate, "at rest" position. As explained in the description of arm 22, the arm 48 is moved from its intermediate position into fully extended position by the depositing of a trailer against the partly opened arm 48.

Means to releasably lock the arms in retracted condition is provided by detents 54 arranged to engage the arm when in fully retracted condition. As illustrated in FIGS. 10 and 11, the rails 10 mount the detents at longitudinally spaced apart positions inwardly of the ends of the arms 48 when retracted. When an arm is moved into retracted position, as will be discussed below, it rides over its associated detent and is held by the frictional abutment of the detent against the arm. The chain 56 interconnects adjacent arms 48, as shown. The chain is arranged to become taut when the preceeding arm is moved into its intermediate "at rest" position "A" as previously described and best illustrated in FIG. 8. Continued movement of the latter arm upon resting a trailer frame against it thus pulls its connected, retracted arm rearwardly, over the detent 54, whereupon its spring 52 moves it to "at rest" position.

The back beam 14" utilizes the same release plate 44 and structure as described earlier. However, the plate is connected by chain 56 to the next succeeding arm 48, rather than the above described cam assembly. Movement of the plate upon depositing a trailer frame against it tensions the chain connected to the arm 48, and the arm is thus pulled from its retracted position over its locking detent, whereupon its spring 52 urges it to its "at rest" position of extension.

For retracting purposes, the arm 48 is configured with a rounded, outwardly projecting portion 48' arranged to provide an outwardly projecting surface against which a trailer frame 26 may abut during removal of the frame from the storage structure.

The operation of the storage system embodied in FIGS. 10 and 11 is as follows: A trailer frame 26 is moved longitudinally into the storage system along the length of the rails 10 and deposited in the storage system space defined by the back beam 14" and the enclosure bar 22'. Upon resting against the plate 44, the weight of the trailer moves the plate rearwardly which pulls the next adjacent arm 48 rearward over the detent 54 by virtue of the plate's connection to the arm by chain 56. The arm 48 moves under the influence of the spring 52 to its intermediate, "at rest" position ready to receive a trailer frame. Upon depositing a frame against the arm, the arm is moved from its intermediate position into its fully extended position, pulling on chain 56 and thereby releasing the next successive arm 48 to swing to its intermediate, trailer-receiving position. The process is repeated, as required to store the desired frames.

The unloading procedure follows the reverse order, beginning at the forward end of the system and progressing rearwardly. The transport vehicle 4 engages the vertically stored trailer of the floor, backs out of the storage structure and lowers the trailer frame to horizontal position on the floor. The vehicle then returns to retrieve the next trailer frame which is stored rearwardly of the one just removed. This frame is engaged and lifted and the vehicle backed out of the structure, as before. Upon backing up, the vehicle brings the trailer frame into abutting contact with the arm 48 of the backside of the outwardly extending next downwardly adjacent trailer storage space just made unoccupied by removal of the first trailer frame. With continued backing movement of the vehicle, the frame pushes the arm 48 toward retracted position. At this point it is desirable that the side shift mechanism of the lift truck carriage 6' be activated to move the trailer frame closely adjacent the rail 10 in order to move the arm 48 over the detent 56. The outwardly projecting portion 48' of the arm enables this to occur. Removal of the next stored trailer frame similarly moves the previously vacated arm 48 in the same manner.

While the second embodiment of the storage system of this invention offers the advantages of economy of manufacture by eliminating the locking cam arm 32 and its associated structural assembly, the first embodiment affords the advantage of positive retraction of the arms by operation of the cam arms 32 after only initiation of retraction of an arm by contact therewith of a trailer frame during removal.

If desired, means may be provided in both embodiments to lock one or more of the trailer frame support arms 22 and 48 in fully extended position, to prevent theft or other unauthorized removal of a trailer frame from the storage system. Such means is illustrated in FIG. 10, wherein an opening 58 in the arm is arranged to register with an opening 58' in the associated rail 10 or 10' when the arm is in fully extended position. Any conventional lock mechanism capable of being extended through the registering openings may be used to secure the arm against retraction.

From the foregoing it will be apparent that this invention provides a highly efficient, space-conserving storage system which utilizes a unique and simplified construction that requires no external hydraulic, electric or other power source or costly control mechanism to achieve a virtually automatic operation.

It will be apparent to those skilled in the art that various changes other than those already described may be made in the size, shape, type, numbers and arrangement or parts described herein without departing from the spirit of this invention and the scope of the appended claims.

Having thus described our invention, and the manner in which it may be used, we claim:

1. A storage system for trailer frames, comprising:
   (a) an elongated framework supported in elevated position above a floor in substantially horizontal position and having front and rear ends, and
   (b) a plurality of trailer frame support arms mounted on the framework at longitudinally spaced positions for horizontal movement between a retracted position adjacent the framework and an extended position projecting laterally outward of the framework for supporting a trailer frame disposed on end in substantially vertical position, whereby, to allow extension of the retracted support arms sequentially from the rear end toward the front end of the framework to enable trailer frames to be moved longitudinally closely adjacent the elongated framework for loading trailer frames sequentially from the rear end of the framework toward the front end thereof and unloading in the reverse sequence.

2. The storage system of claim 1 including a plurality of support arms mounted on the framework for retractable extension to both sides of the framework.

3. The storage system of claim 2 including a plurality of said frameworks supported in laterally spaced apart, parallel positions and secured together at their rear ends.

4. A storage system for trailer frames, comprising:
   (a) an elongated framework supported in elevated position above a floor in substantially horizontal position and having front and rear ends,
   (b) a plurality of trailer frame support arms mounted on the framework at longitudinally spaced positions for movement between a retracted position adjacent the framework and an extended position projecting laterally outward of the framework for supporting a trailer frame disposed on end in substantially vertical position, and
   (c) means operatively engaging the arms for initiating movement of each support arm toward extended position upon movement of the next preceding arm from an intermediate position of extension to fully extended position by engagement of said preceding arm by a trailer frame being positioned for support against said preceding arm.

5. The storage system of claim 4 wherein said arm engaging means includes a cam member associated with each support arm and mounted on the framework for movement between a retracted position releasing its associated arm for movement toward extended position and an extended position engaging its associated arm and moving the latter to retracted position, and connector means interengaging each cam member and the next preceding arm for moving the cam member to retracted position upon movement of the associated arm to fully extended position.

6. The storage system of claim 5 including spring means interengaging the framework and each support arm for urging the latter to said intermediate position of extension, and spring means interengaging the framework and each cam member for urging the latter toward its extended position.

7. The storage system of claim 4 where in said arm engaging means includes connector means interconnecting adjacent support arms for moving a retracted arm toward extended position upon movement of its connected arm from said intermediate position of extension to said fully extended position.

8. The storage system of claim 7 including stop means on the framework arranged to engage each support arm for retaining it releasably in retracted position.

9. A storage system for trailer frames, comprising:
   (a) an elongated framework supported in elevated position above a floor in substantially horizontal position and having front and rear ends,
   (b) a plurality of trailer frame support arms mounted on the framework at longitudinally spaced positions for movement between a retracted position adjacent the framework and an extended position projecting laterally outward of the framework for supporting a trailer frame disposed on end in substantially vertical position, and
   (c) means operatively interengaging each support arm and the framework for moving the arm to fully retracted position upon initial movement of the arm toward retracted position by engagement of said arm by a trailer frame being removed from support by the next preceding arm.

10. The storage system of claim 9 wherein said interengaging means includes a cam member associated with each support arm and mounted on the framework for movement between a retracted position releasing its associated arm for movement toward extended position and an extended position engaging its associated arm and moving the latter to retracted position, and spring means interengaging the framework and each cam member for urging the latter toward its extending position.

11. A storage system for trailer frames, comprising:
    (a) an elongated framework supported in elevated position above a floor in substantially horizontal position and having front and rear ends, and
    (b) a plurality of trailer frame support arms mounted on the framework at longitudinally spaced positions for movement between a retracted position adjacent the framework and an extended position projecting laterally outward of the framework for supporting a trailer frame disposed on end in substantially vertical position, each support arm configured for engagement and movement to retracted position by a trailer frame during its removal from the next preceding support arm.

12. The storage system of claim 11 including stop means on the framework arranged to engage each support arm for retaining it releasably in retracted position.

13. A storage system for trailer frames, comprising:
    (a) an elongated framework supported in elevated position above a floor in substantially horizontal position and having front and rear ends, and
    (b) a plurality of trailer frame support arms mounted on the framework at longitudinally spaced positons for movement between a retracted position adjacent the framework and an extending position projecting laterally outward of the framework for supporting a trailer frame disposed on end in substantially vertical position, each support arm mounted on the framework for pivotal movement between a retracted position extending toward the front of the framework, whereby each arm is pivoted from its laterally extended position to its retracted position upon engagement by a trailer frame as the latter is moved toward the front end of the framework during its removal from the storage system.

* * * * *